(12) United States Patent
O'Neill

(10) Patent No.: US 6,394,889 B1
(45) Date of Patent: May 28, 2002

(54) METHOD AND APPARATUS FOR ASEPTICALLY REMOVING ANIMAL HIDES

(76) Inventor: Richard V. O'Neill, 5809 S. 135th St., Omaha, NE (US) 68137

( * ) Notice: Subject to any disclaimer, the term of this patent is extended or adjusted under 35 U.S.C. 154(b) by 0 days.

(21) Appl. No.: 09/610,823

(22) Filed: Jul. 6, 2000

Related U.S. Application Data

(60) Provisional application No. 60/142,644, filed on Jul. 6, 1999.

(51) Int. Cl.$^7$ ................................................. A22B 5/16
(52) U.S. Cl. ..................... 452/133; 452/125; 452/131; 452/132; 452/128
(58) Field of Search ............................... 452/125, 127, 452/128, 130, 131, 132–133

(56) References Cited

U.S. PATENT DOCUMENTS

| | | | | |
|---|---|---|---|---|
| 77,724 A | * | 5/1868 | Eschenlohr | 452/125 |
| 1,484,618 A | * | 2/1924 | Blades | 452/131 |
| 1,764,425 A | * | 6/1930 | Thomas | 452/131 |
| 3,541,637 A | * | 11/1970 | Robison et al. | 452/128 |
| 4,229,860 A | | 10/1980 | Irwin | 17/50 |
| 4,307,490 A | | 12/1981 | Watkins et al. | 17/50 |
| 4,631,780 A | * | 12/1986 | Leining | 452/133 |
| 4,901,400 A | * | 2/1990 | Karubian | 452/133 |
| 5,167,569 A | | 12/1992 | Davis | 452/130 |
| 5,180,328 A | | 1/1993 | Davis | 452/128 |
| 5,326,310 A | * | 7/1994 | Gugg | 452/133 |
| 5,609,520 A | * | 3/1997 | Stewart | 452/131 |

FOREIGN PATENT DOCUMENTS

| | | | | |
|---|---|---|---|---|
| FR | 2571595 | * | 4/1986 | 452/125 |
| GB | 337585 | * | 11/1930 | 452/131 |

* cited by examiner

Primary Examiner—Charles T. Jordan
Assistant Examiner—Floris C Copier
(74) Attorney, Agent, or Firm—Suiter & Associates PC; Kevin E. West

(57) ABSTRACT

A method and apparatus are disclosed for aseptically separating and removing the hide of an animal from its carcass wherein the hide is separated from the carcass prior to marking of the hide using at least one cutting implement inserted between the hide and the carcass for cutting the connecting tissue attaching the hide and carcass. The hide, once separated, is then marked and removed from the carcass.

31 Claims, 14 Drawing Sheets

METHOD AND APPARATUS FOR ASEPTICALLY REMOVING ANIMAL HIDES

CROSS-REFERENCE TO RELATED APPLICATIONS

The present application claims the benefit under 35 U.S.C. § 119(e) of U.S. Provisional Application No. 60/142,644, filed Jul. 6, 1999. Said U.S. Provisional Application No. 60/142,644 is herein incorporated by reference in its entirety.

INCORPORATION BY REFERENCE

The following related commonly owned U.S. Provisional Application is herein incorporated by reference in its entirety:

| Applicant | Docket No. | Filing Date | Express Mail Label No. |
| --- | --- | --- | --- |
| O'Neill | ONE 99-2-1 | July 6, 2000 | EL 643 197 173 US |

1. Field of the Invention

The present invention relates generally to methods and apparatus for slaughtering and processing animals for meat and/or hides, and more specifically to a method and apparatus for removing the hide from the carcass of an animal.

2. Background of the Invention

During commercial processing of animals (cattle, sheep, swine, etc.) for meat, the animal's hide is conventionally removed from its carcass by apparatus such as a downpulling assembly or downpuller. Typically, the animal, after being killed, is suspended by the hocks of its hind legs from a conveyor and transported to the downpuller. The downpuller grips a previously detached portion of the hide and pulls downwardly thereon forcibly pulling the hide from the animal's carcass.

To be gripped by and removed by such a downpuller, the hide must first be manually detached from large portions of the carcass. Such manual removal of the hide, generally includes the steps of marking or cutting the hide along the animal's underside, and detaching the hide from the sides, tail and rump of the carcass so the hide remains attached only to the back, shoulder, and head and perhaps the front legs. In this manner, a downwardly hanging portion of the hide is provided that may be gripped and removed by the downpuller.

Such methods for removing the hide may, however, expose the carcass to microbiological contamination. Hides of animals being transported to slaughter may become soiled with contaminants such as the animal's fecal matter. Contaminants often contain microorganisms including pathogens such as *Escherichia Coli*, Salmonella, and the like. As the hides are marked, cutting instruments which pierce the hide externally may transmit these contaminants to the carcass. Similarly, as the hide is removed by the downpuller, a great deal of stress is placed on the hide. This stress may cause the external portions of the hide to contact the carcass transferring the contaminants to the carcass. Further, as the hide is removed, stretching of the hide may cause the contaminants to become airborne where they may settle on the now exposed carcass. Similarly, known methods for removing the hide expose the carcass to substantial handling by several operators. Such handling further increases the likelihood of microbiological contamination of the carcass and exposes the operators to unpleasant and dangerous working conditions. For instance, an operator may inadvertently touch a contaminated portion of the hide wherein contaminants containing pathogenic microorganisms are acquired. Should, the operator then handle the carcass, these contaminants may be unknowingly transferred from the operator to the carcass where the microorganisms may be undetectable during inspection.

Known hide removal methods and apparatus may further often damage the hide during its removal, making the hide less valuable for the production of leather. For instance, in order to remove the hide, the downpuller must be capable of exerting a large amount of downward force. This force may cause the hide to stretch resulting in thinned or torn hides. Further, to remove the hide, operators must often cut the fatty connective tissues connecting the hide and carcass as the hide is stripped from the carcass by the downpuller. At times an operator may inadvertently cut the hide during this operation, damaging the hide, and reducing its value.

Consequently, there exists a need for improved methods and apparatus for aseptically removing an animal's hide from its carcass wherein the possibility of contamination of the carcass, and meat obtained therefrom, is reduced, and wherein the likelihood that the hide may be damaged during removal is lessened.

SUMMARY OF THE INVENTION

The present invention is directed to novel methods and apparatus for aseptically separating and removing the hide of an animal from its carcass wherein the hide is separated from the carcass using at least one cutting implement inserted between the hide and the carcass for cutting the connective tissue attaching the hide and carcass. The hide is further marked (either before or after separation from the carcass) and removed from the carcass substantially without significant stretching or pulling. In this manner, the possibility of transferring contaminants from the hide to the carcass, and the meat obtained therefrom is reduced, and the likelihood that the hide may be damaged during removal is lessened.

In accordance with a first aspect of the present invention, a process for separating and removing the hide from a carcass of an animal is disclosed. The process is comprised of the steps of inserting at least one cutting implement suitable for cutting the connecting tissue attaching the hide and carcass between the hide and carcass; moving the cutting implement between the hide and carcass thereby cutting the connecting tissue so as to separate the hide from the carcass; marking the hide to be removed from the carcass; and removing the hide from the carcass. In an exemplary embodiment, a gas may be injected between the hide and the carcass to expand the connecting tissue wherein the hide is at least partially pulled away from the carcass.

In accordance with a second aspect of the present invention, an apparatus for separating and removing the hide of an animal from its carcass is disclosed. The apparatus is comprised of at least one member suitable for being inserted into between the hide and carcass. A cutting implement is disposed on the end of the member. The cutting implement is preferably suitable for cutting the connecting tissue attaching the hide and carcass without damaging the hide and carcass. The member allows the cutting implement to be moved between the hide and carcass wherein the connective tissue is cut by the cutting implement thereby separating the hide from the carcass. In various exemplary embodiments, the cutting implement may comprise a blade, a rotary saw, a laser, or apparatus for emitting a stream of matter under pressure.

It is to be understood that both the foregoing general description and the following detailed description are exemplary and explanatory only and are not restrictive of the invention claimed. The accompanying drawings, which are incorporated in and constitute a part of the specification, illustrate an embodiment of the invention and together with the general description, serve to explain the principles of the invention.

BRIEF DESCRIPTION OF THE DRAWINGS

The numerous objects and advantages of the present invention may be better understood by those skilled in the art by reference to the accompanying figures in which:

FIG. 2 is a side elevational view illustrating the injection of a gas between the hide and the carcass to expand the connecting tissue there between;

DETAILED DESCRIPTION

Reference will now be made in detail to the presently preferred embodiments of the invention, examples of which is illustrated in the accompanying drawings.

Referring generally to FIGS. 1 through 8, methods and apparatus for aseptically separating and removing the hide of an animal from its carcass in accordance with an exemplary embodiment of the present invention is described. In the exemplary embodiments shown, the method and apparatus may be employed by a meat processing facility often referred to as a "meat packing house" or "slaughterhouse." Further, in FIGS. 1 through 8, the present invention is shown, in an exemplary embodiment, as being employed to remove the hide of beef cattle during their processing for meat. It should be appreciated, however, that the methods and apparatus of the present invention may likewise be utilized for hide removal of other meat producing animals such as swine (hogs), sheep, horses, American bison, and the like.

Figure 1:
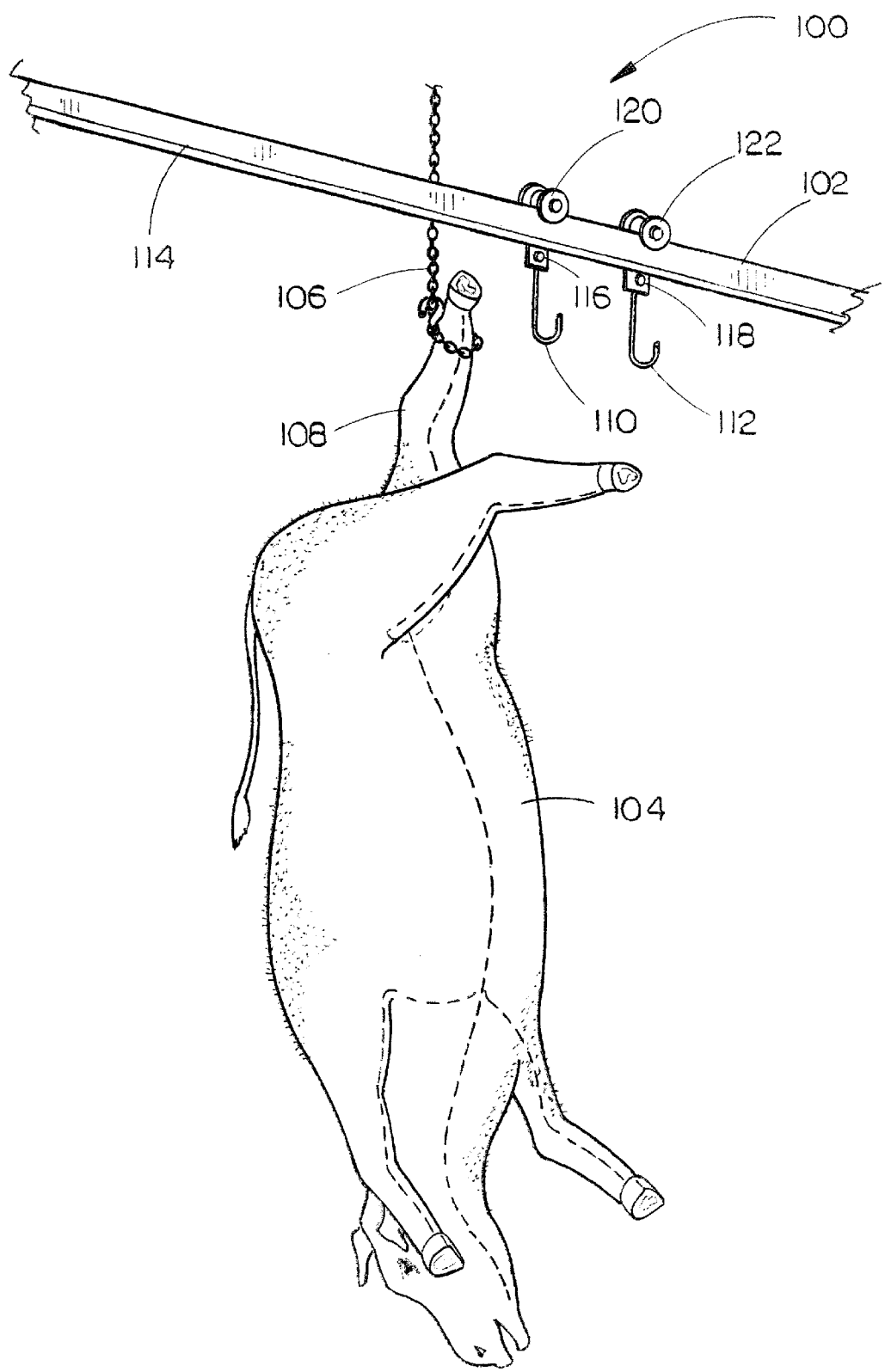
FIG. 1 is a side elevational view illustrating the general operation of a typical meat processing facility wherein the method and apparatus of the present invention may be employed.

Turning now to FIG. 1, the general operation of a typical meat processing facility, wherein the method and apparatus of the present invention may be employed, is described. Such a facility 100 typically utilizes a conveyer system 102 for transporting a slaughtered animal 104 though the various dressing and butchering operations required to ultimately reduce the animal 104 into primal cuts of meat (not shown). In such a meat processing facility 100, the animal 104 is first killed (not shown). A shackle (chain) 106 may then be attached to one of the animal's hind legs 108 for hoisting the animal into a hanging position. The hide of the animal's throat may then be marked (cut) so that the jugular veins in its neck may be severed to bleed the animal. The animal 104 may then be suspended by the hocks of its hind legs on trolleys or hooks 110 & 112 for transport through the facility 100 via the conveyor system 102. For instance, in the exemplary embodiment shown, hooks 110 & 112 may be inserted through the Achilles tendon of the hocks of the animal's hind legs (adjacent to the tarsal joint). The cannon and hoof of the hind legs may then be removed in a conventional manner (see FIG. 4A).

The hooks 110 & 112 are supported by a monorail 114 rigidly mounted to the ceiling and walls of the facility 100. Preferably, hooks 110 & 112 are pivotally supported via hook brackets 116 & 118 having wheels 120 & 122 that engage and role on the monorail 114. In this manner, the animal 104 may be moved from one dressing or butchering operation to the next while supported on the monorail 114 by the hooks 110 & 112.

Figure 2:
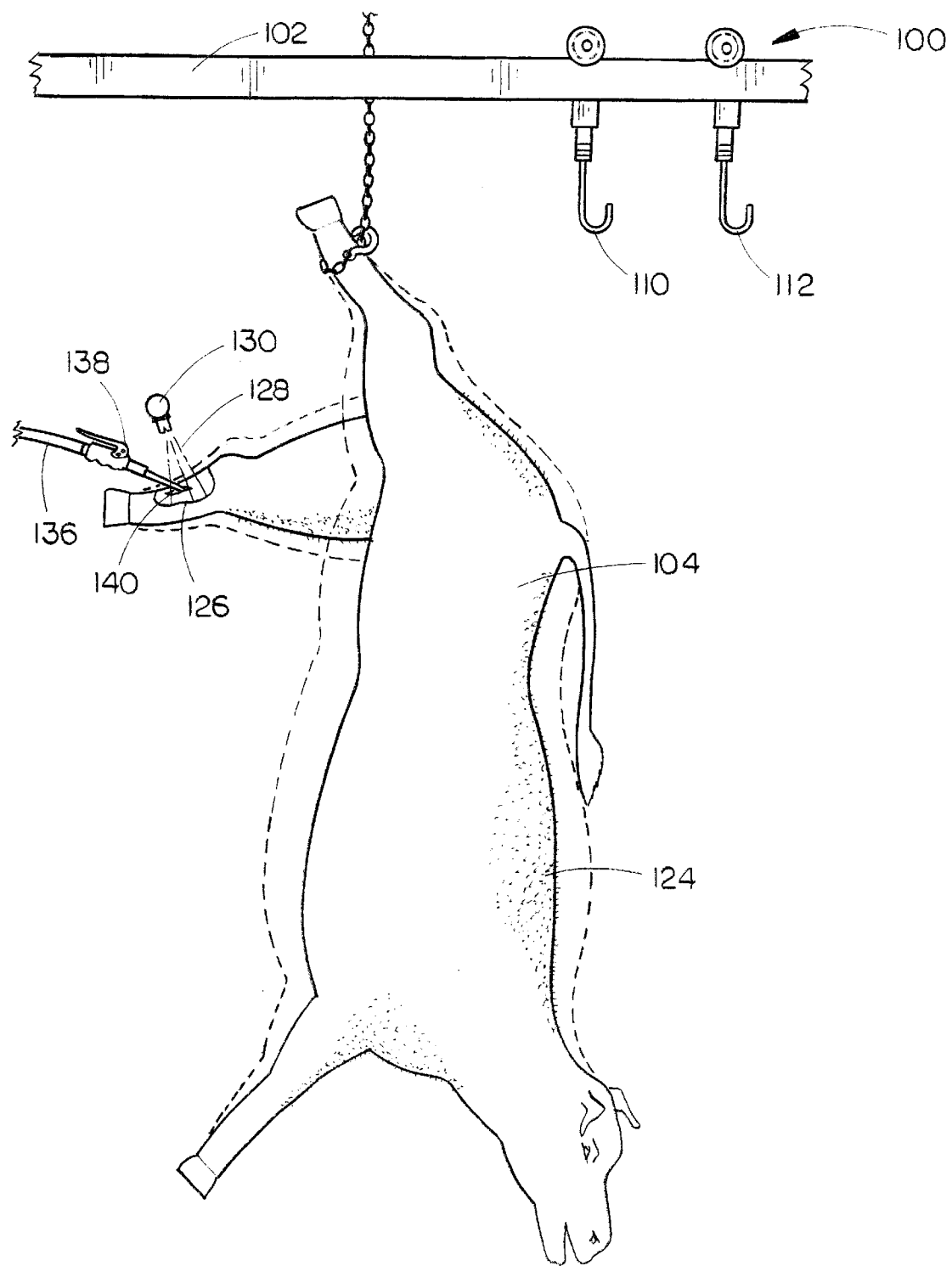

Referring now to FIG. 2, an animal 104 is shown immediately after being killed and prior to being suspended from hooks 110 & 112 wherein the animal 104 is hung from the shackle 106 by its hind leg 108. In preparation for removal of the animal's hide 124, in accordance with the present invention, a gas may be injected between the hide 124 and the carcass (not shown) to expand the connecting tissue or fascia attaching the hide and muscle of the carcass. In this manner, the hide 124 is at least partially pulled away from the carcass to facilitate insertion and movement of the apparatus of the present invention (FIG.3 through 6) between the hide 124 and carcass. In FIG. 2, injection of the gas is shown as being accomplished before the animal 104 is suspended from hooks 110 & 112. However, it should be appreciated that injection of the gas may alternately be accomplished at any time prior to separation of the bide 124 from the animal in accordance with the present invention (FIGS. 4A through 4D).

As shown in FIG. 2, an area 126 of the animal's hide 124 through which the gas is injected may be sterilized by application of a sterilizing or disinfecting agent 128.

Preferably, the sterilized area 126 is located so as to not degrade the value of the hide 124 for later use (e.g., in the production of leather). For instance, in FIG. 2, the sterilized area 126 is located on the cannon of the animal's hind leg. Alternately, the sterilized area 126 may be located along an area where the hide 124 is to be marked (see FIG. 6).

Exemplary disinfecting agents 128 utilized for sterilization of the area 126 include substances suitable for killing or neutralizing pathogenic microorganisms which may be found in contaminants on the surface of the animal's hide 124. Preferably, such disinfecting agents would also be substantially non-harmful if consumed by humans (at least in small quantities) should the substances come into contact with the animal's carcass, and the meat produced therefrom.

Application of the disinfecting agent 128 is preferably accomplished via a low pressure spray. Such a low pressure spray application is preferred because the apparatus utilized to apply the disinfecting agent, i.e., spray nozzle 130, would not come into contact with the hide thereby reducing the possibility that the application apparatus would acquire contaminants from the hide. Further, use of a low pressure spray application would reduce the possibility that the contaminants could become dislodged by the force of the sprayed disinfecting agent 128 and become airborne. However, it will be appreciated that use of other application methods such as brushing, high pressure spraying, pouring, etc., although less desirable, are anticipated and would not depart from the scope and spirit of the invention.

Figure 3B:
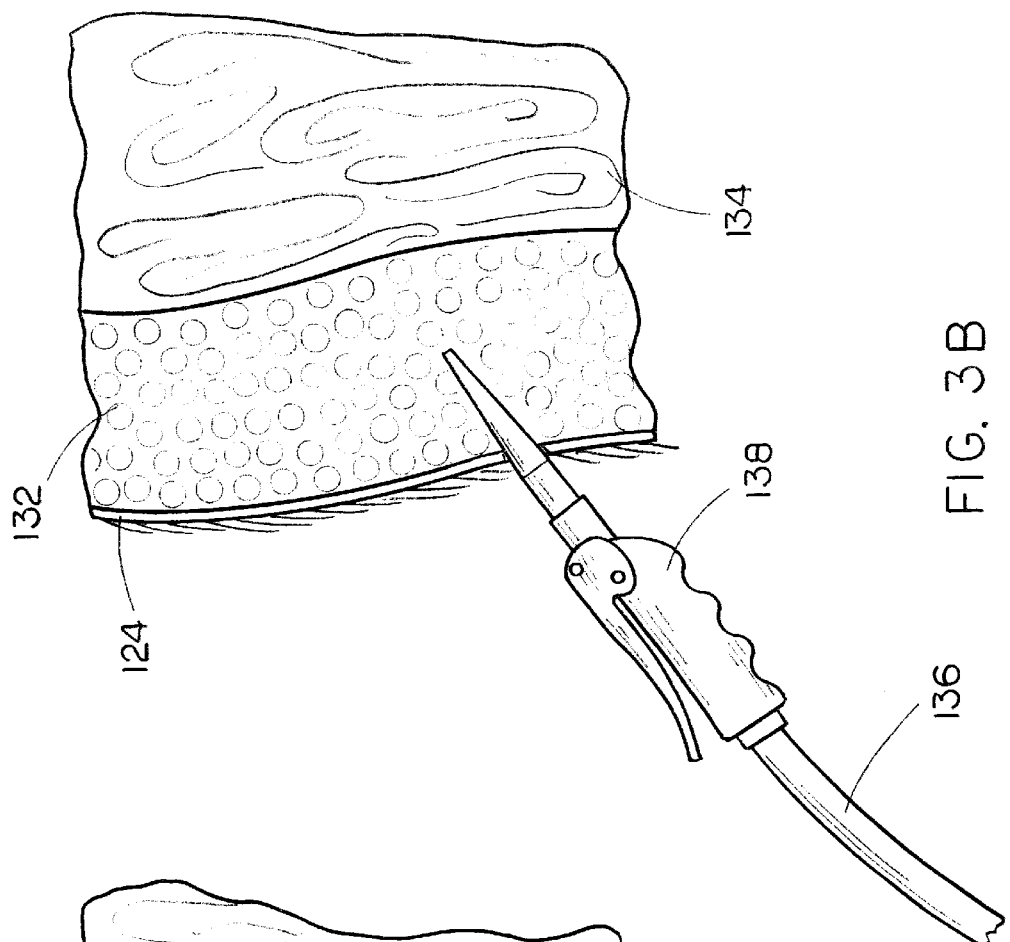
FIGS. 3A and 3B are cross-sectional views of a hide and carcass illustrating expansion of the connecting tissue wherein the hide is at least partially pulled away from the carcass.
Figure 3A:
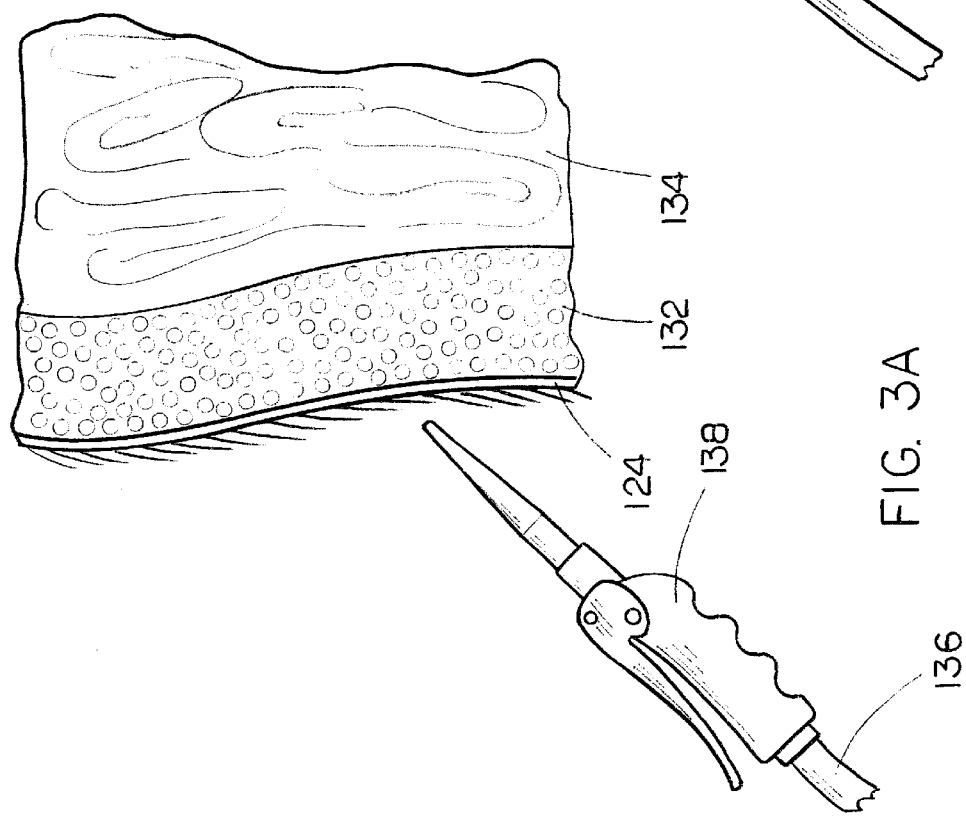

As shown in FIGS. 3A, and 3B, the gas is injected into the layer of connecting tissue or fascia 132 through the hide 124 within the sterilized area 126. As the gas is absorbed by the connecting tissue, the connecting tissue is expanded or inflated from its normal thickness, shown in FIG. 3A, to an expanded thickness, shown in FIG. 3B. As a result, the animal's hide 124 is pulled away from the carcass 134. As viewed externally, as in FIG. 2, expansion of connecting tissue 132 (FIGS. 3A and 3B) would cause the animal's hide 124 appear inflated as indicated by the dashed line.

Preferably, the gas is filtered prior to injection to remove pathogenic microorganisms and other harmful contaminants, which contaminants could be absorbed by the carcass 134 and meat obtained therefrom. For instance, in an exemplary embodiment, the gas may comprise compressed air passed through a suitable hepafilter (not shown) and injected via nozzle assembly 136 coupled to the air source via a hose 138. Alternately, other filtered, compressed gases (e.g., nitrogen, carbon dioxide, helium, etc.) may be utilized, provided the gasses, if absorbed by the carcass 134, would not permanently affect the safety or desirability of meat obtained therefrom. For example, the gas should not leave harmful residues in or on meat obtained from the carcass 134, or affect the meat's taste, color, texture, etc.

As shown in FIG. 2, in an exemplary embodiment, an incision 140 may be made in the hide 124 within the sterilized area 126. Nozzle 136 may then be inserted between the hide 124 and carcass (not shown) whereupon the gas is injected into the connecting tissue (not shown). Alternately, as shown in FIGS. 3A and 3B, the nozzle 136 may include a lance 142 for piercing the hide 124. Preferably, the sterilized area 126 wherein the incision or hole 140 is made for insertion of the nozzle 136 is chosen to minimize damage to the hide 124 so as to not reduce the hide's value. For example, in an exemplary embodiment wherein the animal is a cow, as shown in FIG. 2, the area 126 chosen may be located on the canon of the non-supported leg. Alternately, the area 126 chosen may be located so that the incision or hole 140 may be made at points where the animal is to be marked (see FIG. 6).

Figure 4A:
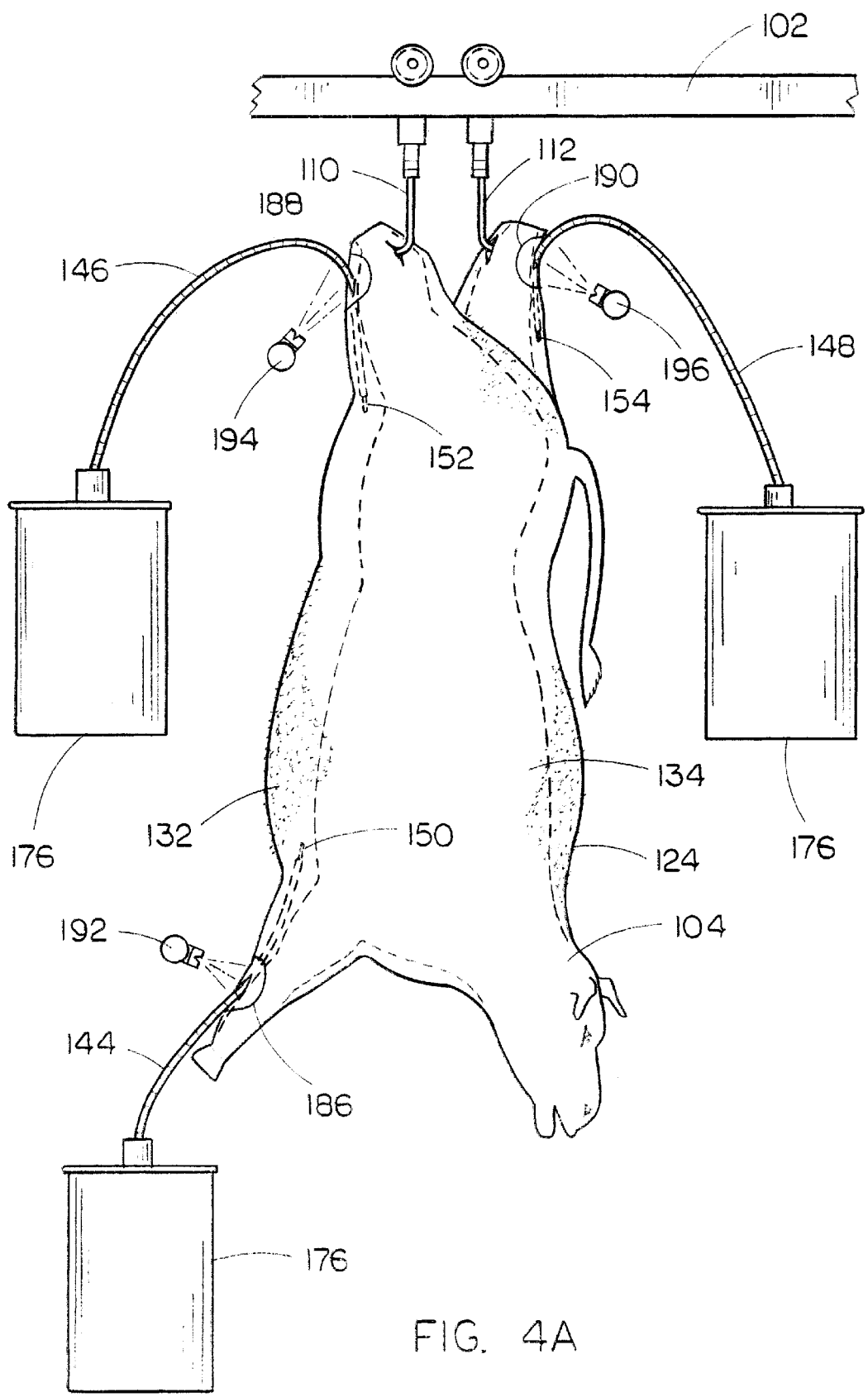
FIG. 4A is a side elevational view illustrating the insertion of cutting members between the hide and carcass to cut the connecting tissue attaching the hide to the carcass prior to marking the hide.
Figure 4B:
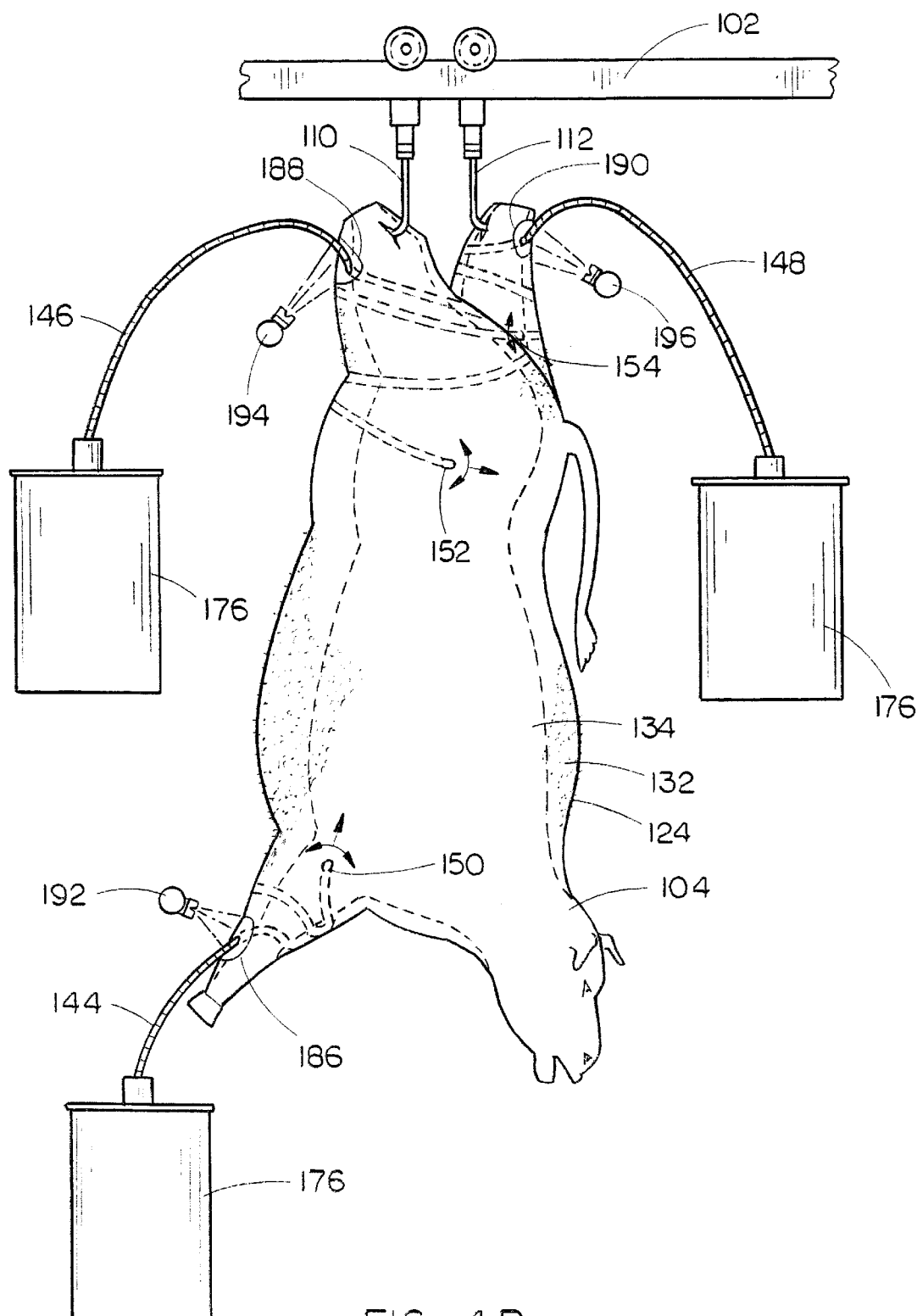
FIG. 4B is a side elevational view illustrating movement of the cutting members between the hide and carcass in accordance with an exemplary embodiment wherein the cutting members are spiraled around the carcass in a substantially predetermined pattern.
Figure 4C:
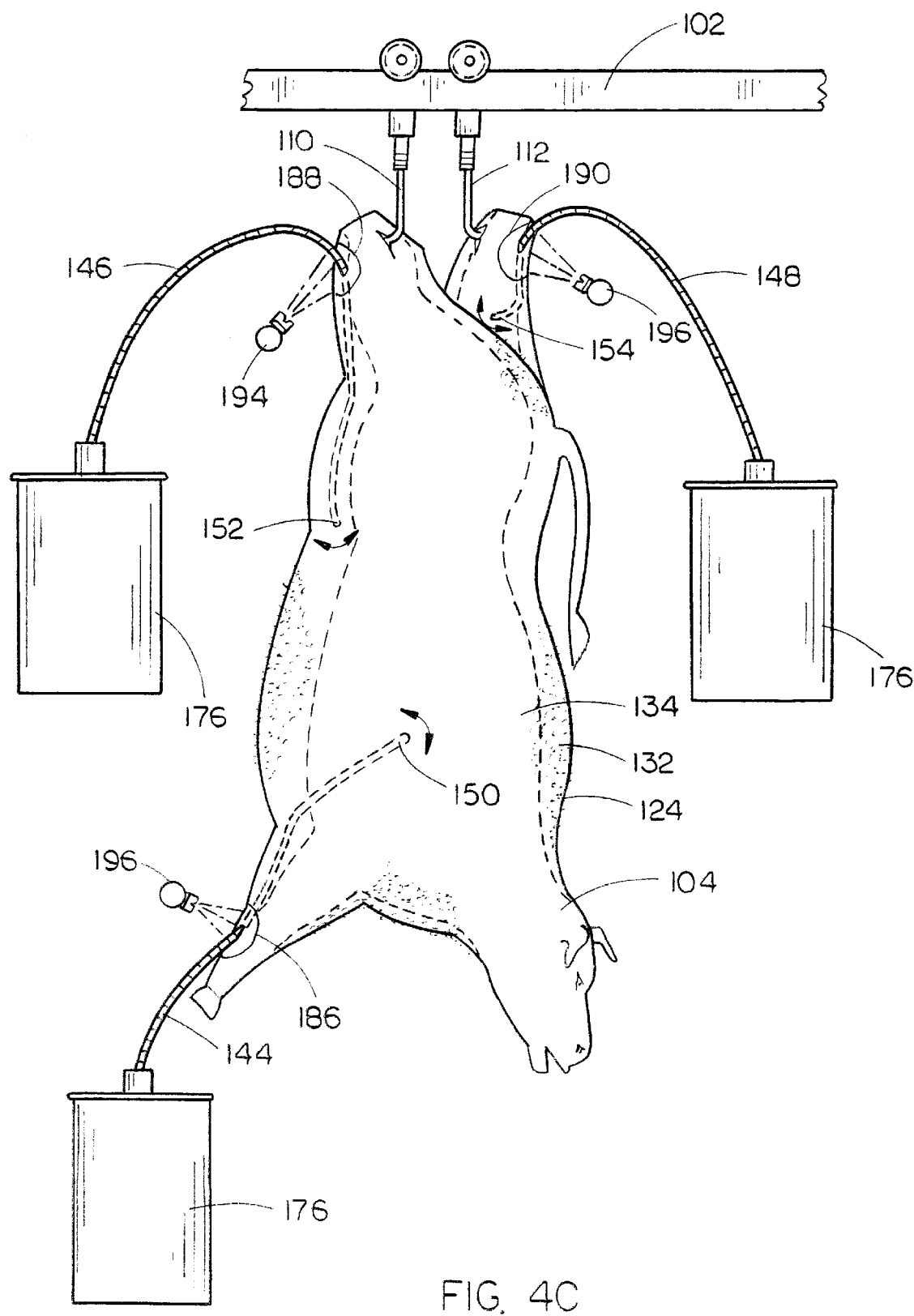
FIG. 4C is a side elevational view illustrating movement of the cutting members between the hide and carcass in accordance with an alternative embodiment wherein the cutting members are moved between the hide and carcass in a substantially random pattern.
Figure 4D:
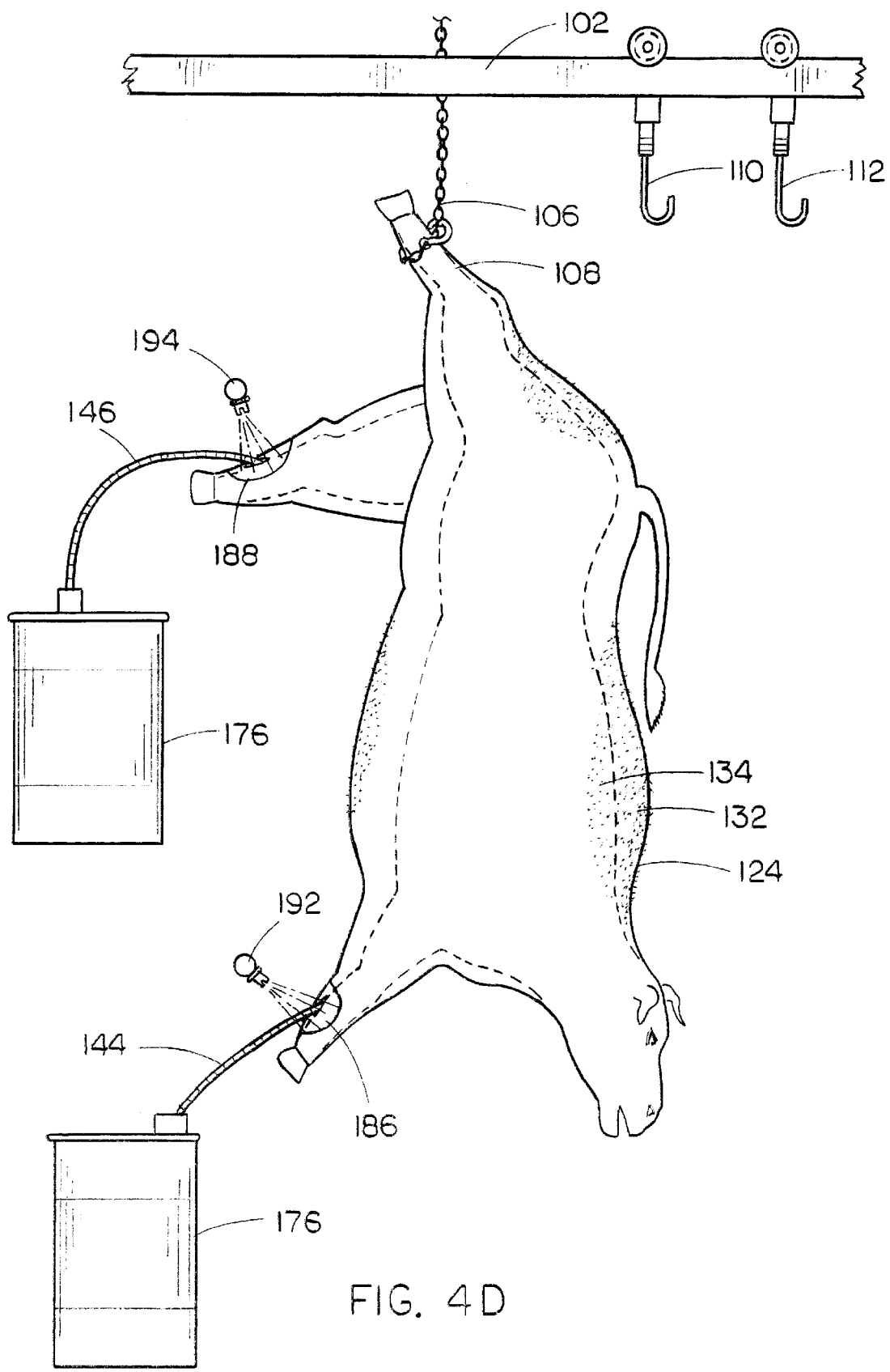
FIG. 4D is a side elevational view illustrating the insertion of cutting members between the hide and carcass to cut the connecting tissue attaching the hide to the carcass prior to marking of the hide, wherein the animal is hoisted by a shackle prior to removal of the cannons and hoofs of the hind legs.

Referring now to FIGS. 4A, 4B, 4C and 4D, separation of the hide from the carcass prior to marking the hide in accordance with the present invention is illustrated. In FIGS. 4A, 4B, and 4C, the animal 104 is shown suspended from conveyor system 102 by hooks 110 & 112 after removal of the cannons and hoofs of the hind legs. Alternately, as shown in FIG. 4D, separation of the hide 124 may be accomplished while the animal 104 is being hoisted by shackle 106, prior to suspension of the animal 104 from hooks 110 & 112 and removal of the cannons and hoofs of its hind legs.

As shown in FIGS. 4A and 4D, one or more cutting members 144, 146 & 148 are inserted between the hide 124 and carcass 134 of the animal 104. As shown in FIG. 4A, a cutting implement 150, 152 & 154 is operably mounted to the end of each cutting member 144, 146 & 148. The cutting implement 150, 152 & 154 is preferably suitable for cutting the connecting tissue 132 attaching the hide 124 and carcass while avoiding damage (e.g., cutting, burning, etc.) to the hide 124 and carcass 134. As discussed in the description of FIGS. 2, 3A and 3B, supra, prior to insertion of the cutting members 144, 146 & 148, a gas may be injected between the hide 124 and the carcass 134 to expand the connecting tissue 132 so the hide 124 is at least partially pulled away from the carcass 134 to facilitate insertion and movement of the cutting members 144, 146 & 148 and associated cutting implements 150, 152 & 154 between the hide 124 and carcass 134.

Figure 5A:
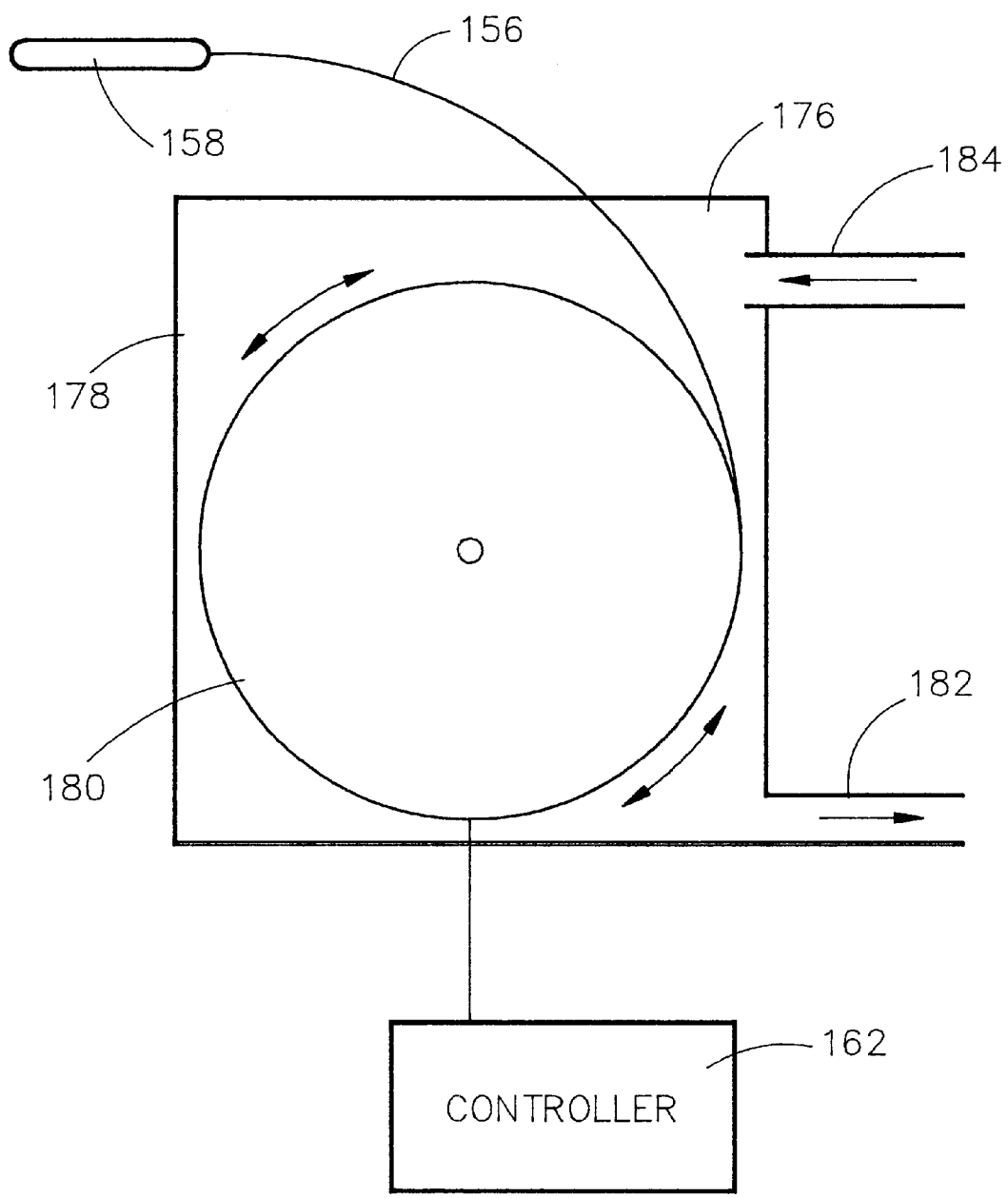
FIG. 5A is a diagrammatic view of an exemplary apparatus for separating the hide from the carcass.

Turning now to FIG. 5A, an exemplary hide separation apparatus, suitable for use in separating the hide from the carcass as shown in FIGS. 4A through 4D, is described. As shown in FIG. 5A, the hide separation apparatus includes a cutting member 156 corresponding to cutting members 144, 146 & 148 shown in FIGS. 4A through 4D). Cutting implement 158 corresponding to cutting implements 150, 152 & 154 in FIGS. 4A through 4D, is shown mounted to cutting member 156.

Figure 5B:
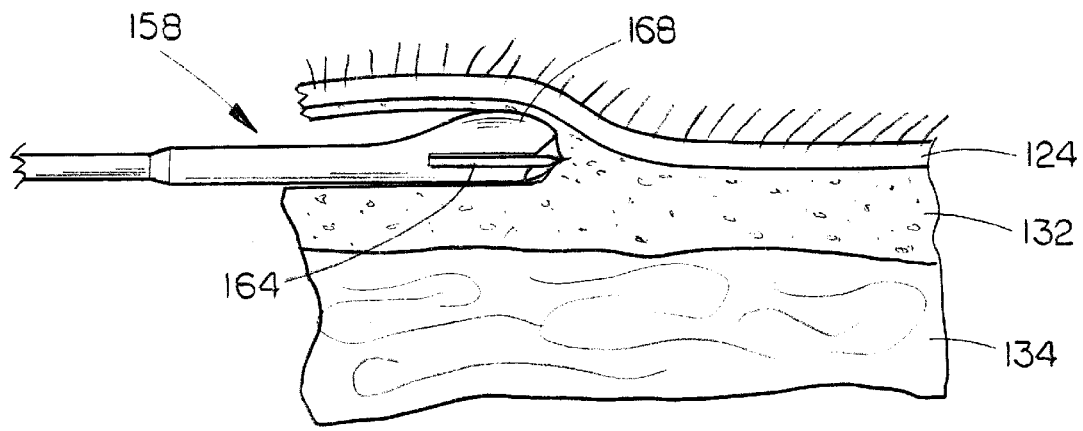
FIG. 5B is a partial cross-sectional side elevational view of a cutting implement comprising a rotary saw in accordance with an exemplary embodiment of the present invention.
Figure 5C:
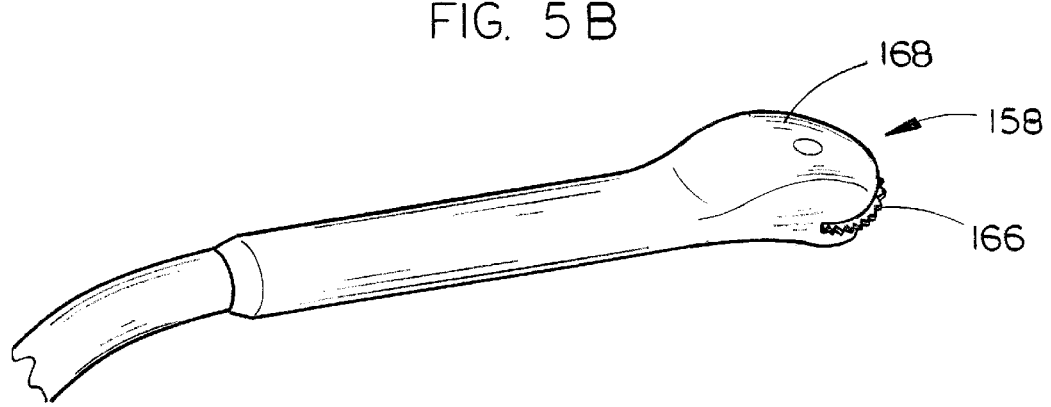
FIG. 5C is an isometric view of the rotary saw cutting implement shown in FIG. 5B.

In the exemplary embodiment shown, cutting member 156 is comprised of a flexible appendage having one or more segments 160 that may be articulated so as to determine the path taken by the cutting implement 158 through the connecting tissue layer 132 (FIGS. 4A through 4D). In such an embodiment, the cutting member would be manipulated in a manner much like existing endoscopic or laparoscopeic instruments so as to control movement. Control of the path taken by the cutting member 156 through the connecting tissue 132 and operation of the cutting implement 158 may be provided manually by an operator, or alternately may be robotically controlled by a controller 162. In FIGS. 5B through 5E, exemplary cutting implements 158 are illustrated. As shown in FIGS. 5B and 5C the cutting implement 158 may be comprised of knife blade 164 (FIG. 5A) or saw 166 (FIG. 5C) suitable for cutting the connecting tissue 132 attaching the hide 124 to the carcass 134. The blade 164 or saw 166 may be protected by a shield assembly 168 for shielding the hide 124 and carcass 134 to prevent cutting of the hide 124 and carcass 134. As shown in FIG. 5B, the saw 166 may be a rotary saw such as is commonly utilized in the meat processing industry. Alternately, the saw 166 may comprise one or more reciprocating blades (not shown).

In another exemplary embodiment, shown in FIG. 5C, the cutting implement 158 may be comprised of a laser 168. Preferably, the laser 168 would be capable of ablating the fatty connecting tissue 132 attaching the hide 124 and carcass 134 without cutting or burning the carcass 134 or hide 124. For instance, the laser 166 may be pulsed and may have suitable power to cut the fatty connecting tissue 132 but not the hide 124 or carcass 132. Preferably, the pulse length or power level may be adjusted to control the depth of connecting tissue ablated. Exemplary lasers include ultraviolet excimer lasers, $CO_2$ lasers, YAG lasers, and the like.

Figure 5D:
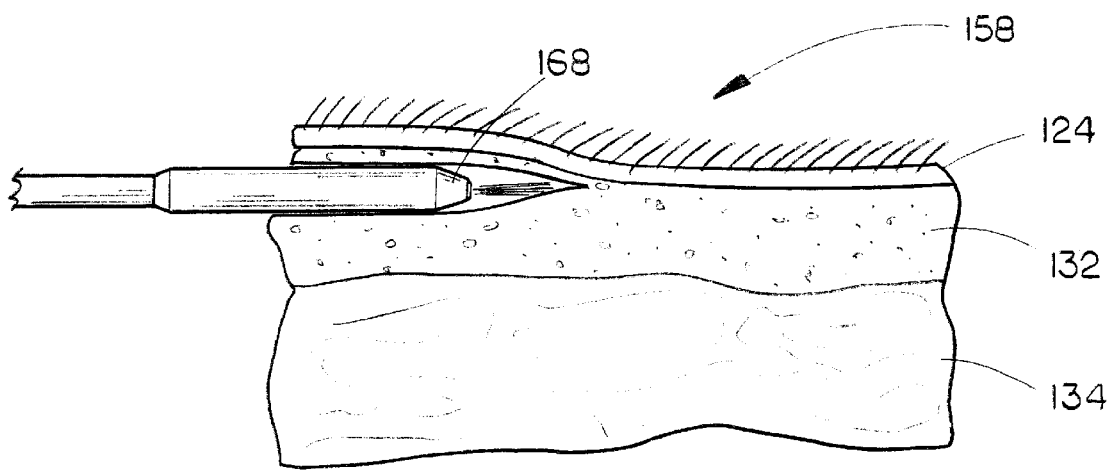
FIG. 5D is a partial cross-sectional side elevational view of a cutting implement comprising a laser in accordance with an exemplary embodiment of the present invention.
Figure 5E:
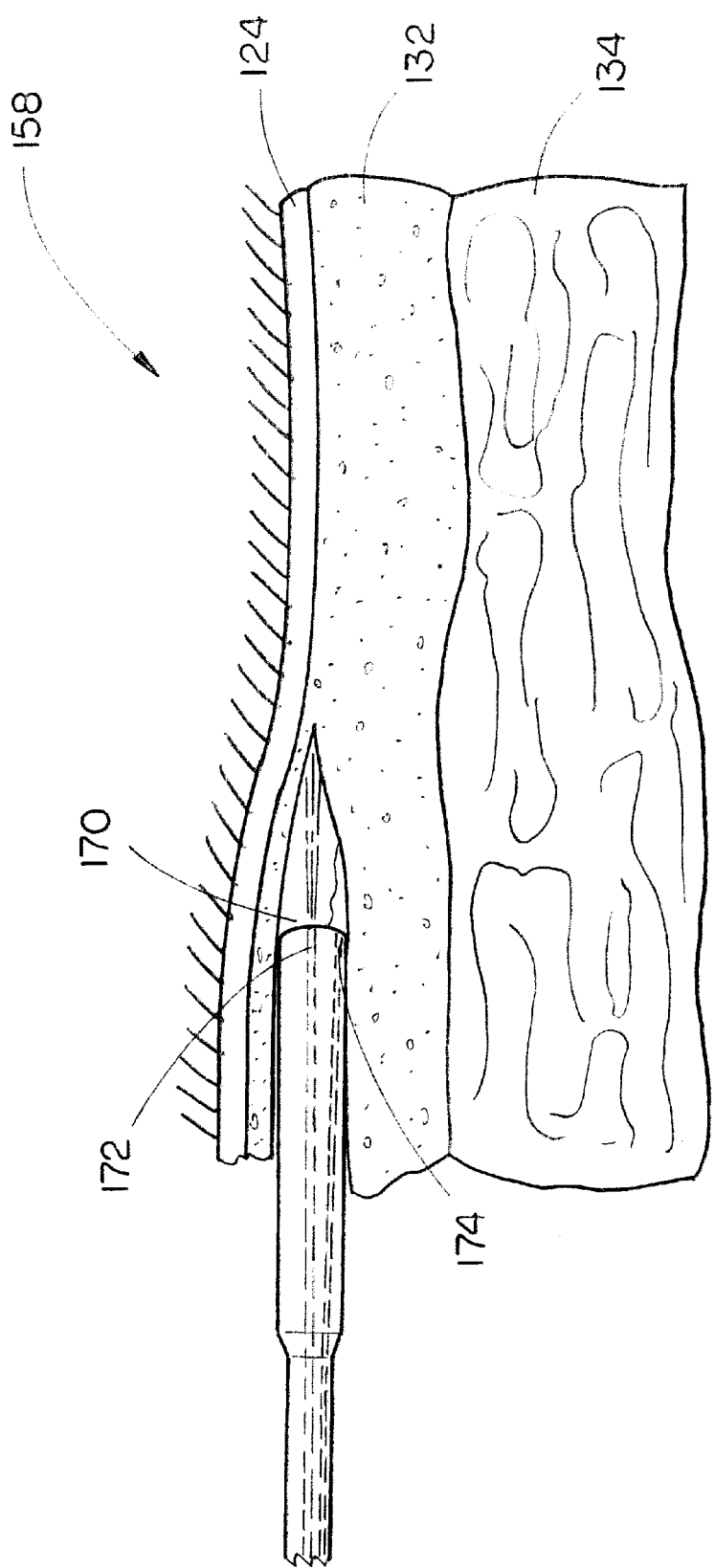
FIG. 5E is a partial cross-sectional side elevational view of a cutting implement comprising an apparatus for emitting a stream of matter under pressure in accordance with an exemplary embodiment of the present invention.

In yet another exemplary embodiment, shown in FIG. 5E, the cutting implement 158 may be comprised of a nozzle assembly 170 suitable for emitting a stream of matter 172 under sufficiently high pressure to cut the connecting tissue 132 attaching the hide 124 to the carcass 132. For instance, such a nozzle assembly 170 may be comprised of a nozzle 172 for emitting a stream of water under high pressure. At a controlled pressure, this stream of water would be capable of cutting through the connecting tissue 132, but would be unable to cut the hide 124 or carcass 134. Preferably, the water would be heated to a sufficient temperature to kill or neutralize any pathogenic microorganisms absorbed from the hide 124. As shown in FIG. 5D, the nozzle assembly 170 may further include apparatus (e.g., a vacuum 172) for evacuating the matter (e.g., water) injected between the hide 124 and carcass 134 to cut the connecting tissue 132.

It should be appreciated that the cutting implements illustrated in FIGS. 5A through 5D are exemplary only and not exhaustive of all possible cutting implements suitable for use by the apparatus of the present invention. Consequently, substitution of other kinds of cutting implements for those specifically disclosed herein by those of skill in the art is anticipated and would not depart from the scope and spirit of the present invention.

Turning again to FIG. 5A, the cutting member 156 and cutting implement 158 may be sterilized to reduce the possibility of transfer of contaminants to the carcass (see FIGS. 4A through 4D). For instance, when not in use, cutting member 156 and cutting implement 158 may be retracted into a sterilizing assembly 176 to remove any contaminants that may have been acquired thereby during hide separation of a previously processed animal and to prevent the cutting member 156 and cutting implement 158 from acquiring any airborne contaminants. In an exemplary embodiment, the sterilizing assembly 176 is comprised of a vessel 178 having disposed therein a spool 180 onto which the cutting member 156 may be wound when not in use. A suitable cleaning and sterilizing agent 128 may be circulated through the vessel 178 to clean and sterilize the cutting member 156 and cutting implement 158. Preferably, the used cleaning and sterilizing agent 128 is continuously evacuated from the vessel 178 via a drain 182 and replenished with unused agent 128 via an input 182. Suitable cleaning and sterilizing agents include sufficiently hot water and chemical substances capable of killing or neutralizing pathogenic microorganisms which may be found in contaminants acquired from an animal, and which would be substantially non-harmful if consumed by humans (at least in small quantities) should the substances come into contact with the animal's carcass, and the meat produced therefrom.

Referring again to FIGS. 4B and 4C, each cutting member 144, 146 & 148 may be utilized to move its associated cutting implement 150, 152 & 154 through the layer of connecting tissue 132 between the animal's hide 124 and carcass 134. The cutting implements 150, 152 & 154 may then cut the connecting tissue 132 as they move, substantially separating the hide 124 from the carcass 134.

In an exemplary embodiment, each cutting member 144, 146 & 148 may move its respective cutting implement 150, 152 & 154 through the connecting tissue 132 in a predetermined pattern. For instance, as shown in FIG. 4B, each cutting member 144, 146 & 148 may be guided so as to spiral about the carcass 134 in a substantially uniform fashion. As each cutting member 144, 146 & 148 moves, its cutting implement 150, 152 & 154 may pivot from side to side in relation to the surfaces of the hide 124 and carcass 134 so a larger area of connecting tissue 132 is cut.

Alternately, as shown in FIG. 4C, the cutting implements 150, 152 & 154 may be moved through the connecting tissue 132 in a generally random pattern for a period of time or until it is determined that the hide 124 is substantially separated from the carcass 124. Again, the cutting implements 150, 152 & 154 may pivot from side to side in relation to the surfaces of the hide 124 and carcass 134 so a larger area of connecting tissue 132 is cut during each pass of the cutting member 144, 146 & 148.

As shown in FIGS. 4A through 4D, the cutting members 144, 146 & 148 may be inserted through the hide 124 at points where the hide 124 is to be marked to avoid damage that would reduce the hide's value for the production of leather. Preferably, areas 186, 188 & 190 of the animal's hide 124 wherein a cutting member 144, 146 & 148 is to be inserted are sterilized by application of a sterilizing or disinfecting agent 128. As discussed in the description of FIG. 2, supra, exemplary disinfecting agents 128 include substances suitable for killing or neutralizing pathogenic microorganisms which may be found in contaminants on the surface of the animal's hide 124, and which would be substantially non-harmful if consumed by humans (at least in small quantities) should the substances come into contact with the animal's carcass 134, and the meat produced therefrom. Further, application of the disinfecting agent 128 is preferably accomplished via a low pressure spray 111 to prevent contamination of the application apparatus (e.g., spray nozzles 192, 194 & 196) and to reduce the possibility that the contaminants could become dislodged by the force of the sprayed disinfecting agent 128 and become airborne.

Figure 6:
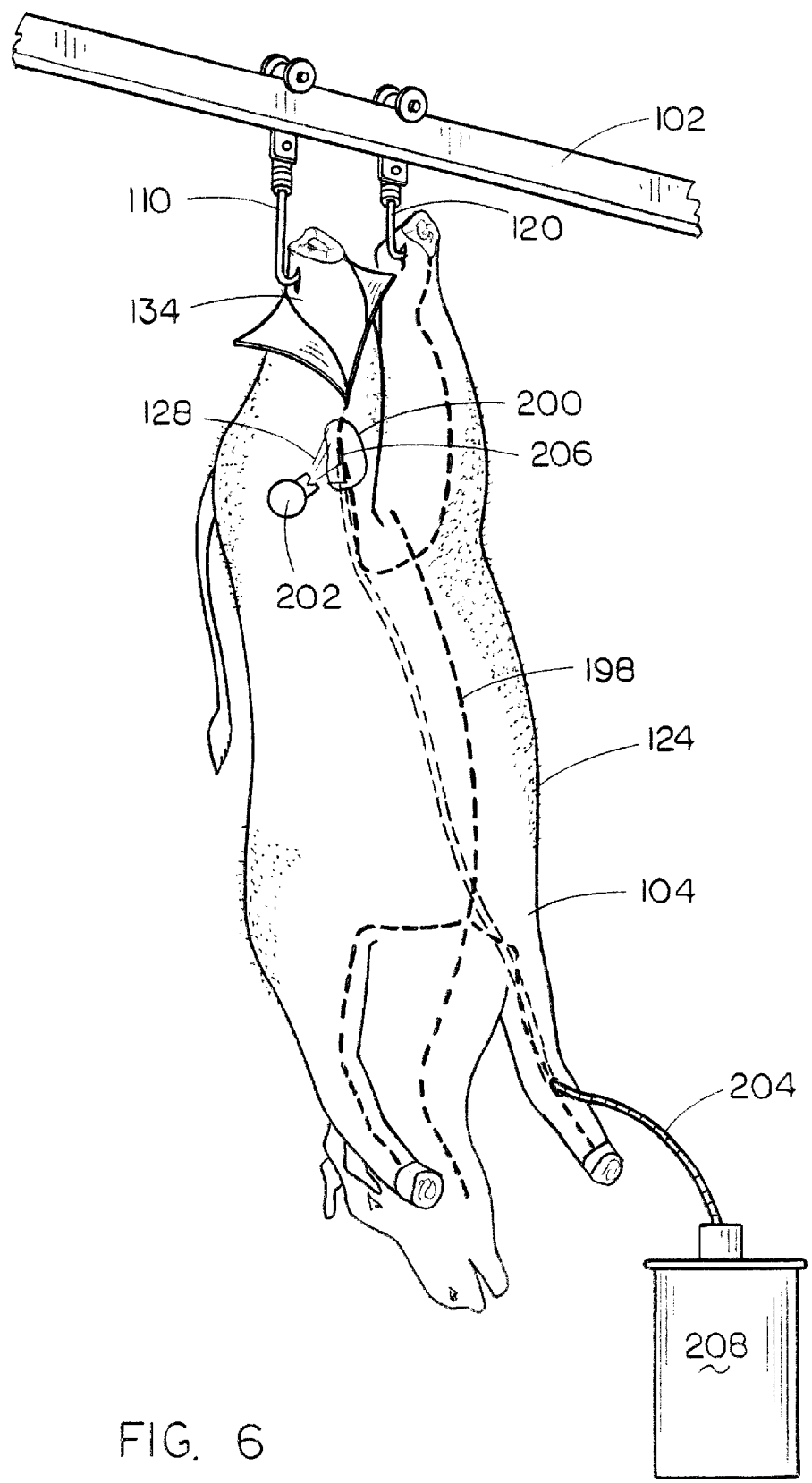
FIG. 6 is a side elevational view illustrating marking of the hide in accordance with an exemplary embodiment of the present invention.

Referring now to FIG. 6, marking of the hide for removal in accordance with the present invention is shown. Marking comprises the process of cutting the hide 124 along the animal's underside, legs and throat so the hide 124 may be removed from the carcass 134. The incision to be made in the hide 124 when marked is illustrated in FIG. 6 by dashed line 198. In FIG. 6, the animal 104 is shown suspended from conveyor system 102 by hooks 110 & 112 after removal of the cannons and hoofs of the hind legs. Marking of the hide may alternately be accomplished prior to its suspension from hooks 110 & 112 and/or removal of the cannons and hoofs. Further, it should be appreciated that marking of the hide 124, as shown in FIG. 6, may be accomplished either before or after separation of the hide 124 from the carcass 134 as discussed in the description of FIGS. 4A through 4D.

As shown in FIG. 6, an area 200 of the animal's hide 124 along the line 198 to be marked is sterilized by application of a suitable sterilizing or disinfecting agent 128. As discussed in the description of FIG. 2, exemplary disinfecting agents 128 include substances suitable for killing or neutralizing pathogenic microorganisms which may be found in contaminants on the surface of the animal's hide 124, and which would be substantially non-harmful if consumed by humans (at least in small quantities) should the substances come into contact with the animal's carcass, and the meat produced therefrom. Further, as discussed in the description of FIG. 2, application of the disinfecting agent 128 is preferably accomplished via a low pressure spray to prevent contamination of the application apparatus (e.g., nozzle 202) and to reduce the possibility that the contaminants could become dislodged by the force of the sprayed disinfecting agent 128 and become airborne.

One or more marking members 204 are inserted between the hide 124 and carcass 134. Preferably, each such marking member 204 is inserted through the hide 124 at points selected along the line 198 where the animal 104 is to be marked to avoid damage to the hide 124 and reduction of its value (e.g., in the production of leather). A marking implement 206 is disposed on the end of the marking member 204. The marking implement 206 is preferably suitable for cutting through the hide 124 along the line 198 to be marked.

Figure 7A:
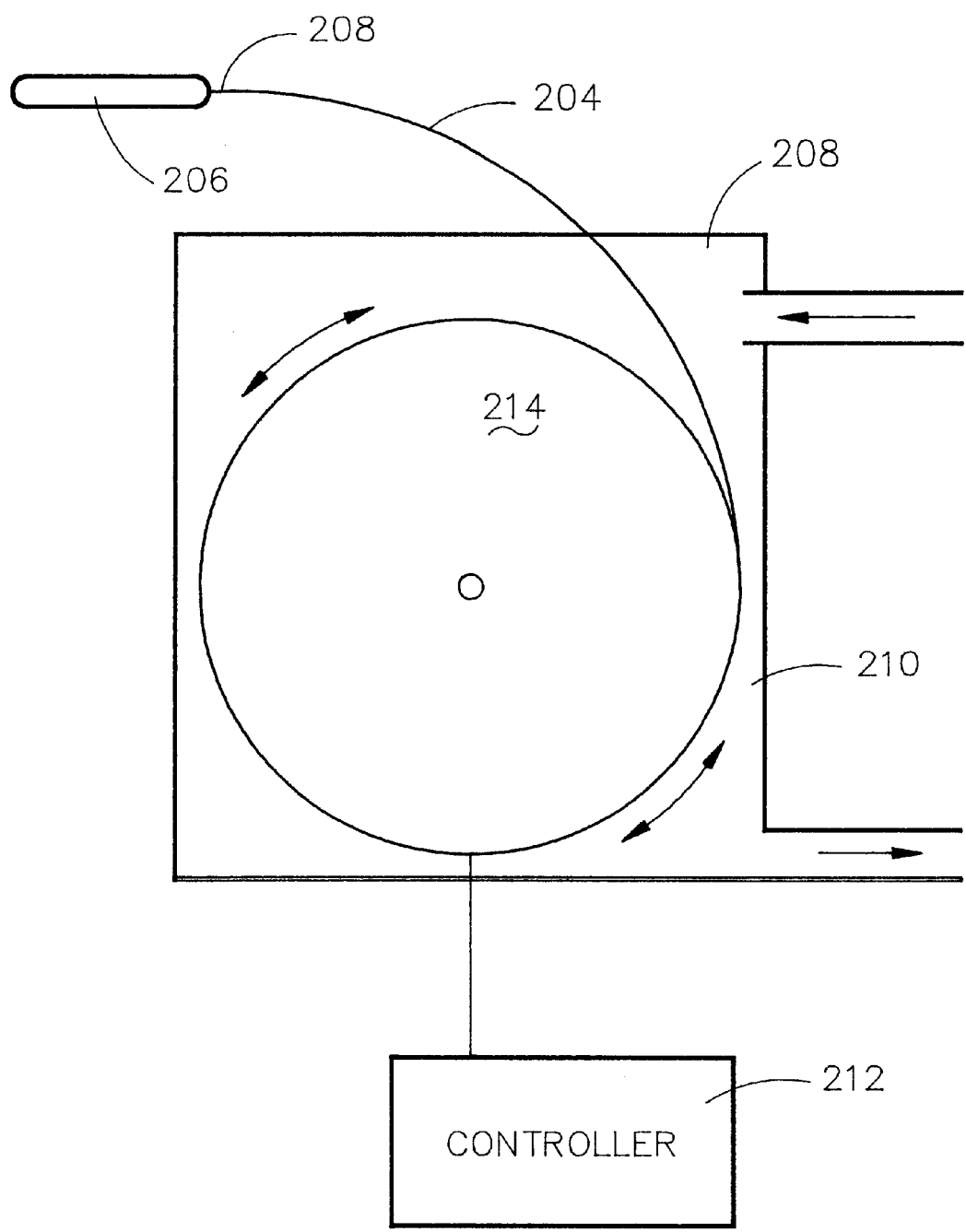
FIG. 7A is a diagrammatic view of an exemplary apparatus for marking the hide.

Referring now to FIG. 7A, an exemplary hide marking apparatus, suitable for use in marking the hide as shown in FIG. 6 is described. As shown in FIG. 7A, the hide marking apparatus includes marking member 204. Marking implement 206 is shown mounted to marking member 204. Marking member 204 may, in an exemplary embodiment be comprised of a flexible appendage having one or more segments 208 that may be articulated so as to determine the path taken by the marking implement 206 while cutting hide 124 (FIG. 6). In such an embodiment, the marking member 204 would be manipulated in a manner much like existing endoscopic or laparoscopeic instruments so as to control is movement. Control of the marking member 156 and operation of the marking implement 206 may be provided manually by an operator, or alternately may be robotically controlled by a controller 210.

The marking member 204 and marking implement 206 may be sterilized to reduce the possibility of transfer of contaminants to the carcass 134 (FIG. 6). Thus, when not in use, marking member 204 and marking implement 206 may be retracted into a sterilizing assembly 208 similar to the sterilizing assembly 176 shown in FIG. 5A. In an exemplary embodiment, the sterilizing assembly 208 is comprised of a vessel 212 having disposed therein a spool 214 onto which the marking member 204 may be wound when not in use. A suitable cleaning and sterilizing agent 128 may be circulated through the vessel 212 to clean and sterilize the marking member 204 and marking implement 206.

Figure 7B:
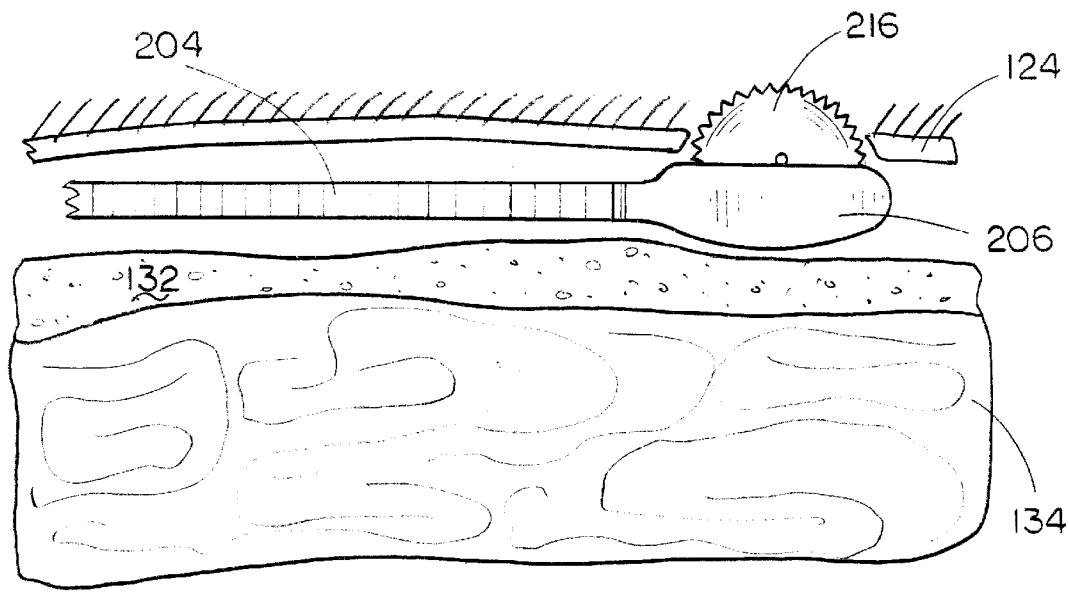
FIG. 7B is a partial cross-sectional side elevational view of a marking implement comprising a rotary saw in accordance with an exemplary embodiment of the present invention.
Figure 7C:
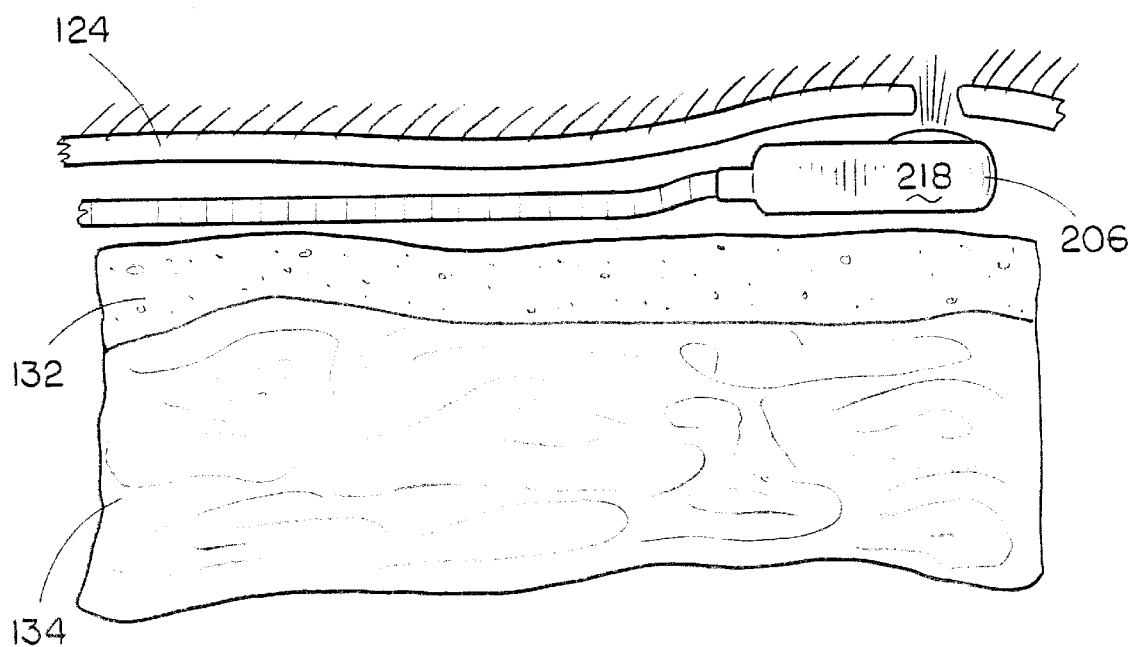
FIG. 7C is a partial cross-sectional side elevational view of a cutting implement comprising a laser in accordance with an exemplary embodiment of the present invention.

In FIGS. 7B and 7C, exemplary marking implements 206 are illustrated. As shown in FIG. 7B the marking implement 206 may be comprised of knife blade or saw 216 suitable for the hide 124. For instance, as shown in FIG. 7B, an exemplary marking implement 206 may utilize a rotary saw such as is commonly utilized in the meat processing industry. In another exemplary embodiment, shown in FIG. 7C, the marking implement 206 may be comprised of a laser 218. The laser 218 may be pulsed so that its cutting depth is controlled to be just sufficient to cut through the hide 124. Exemplary lasers include ultraviolet excimer lasers, $CO_2$ lasers, YAG lasers, and the like.

It should be appreciated that the marking implements 206 illustrated in FIGS. 7B and 7C are exemplary only and not exhaustive of all possible marking implements suitable for use by the apparatus of the present invention. Consequently, substitution of other kinds of marking implements for those specifically disclosed herein by those of skill in the art is anticipated and would not depart from the scope and spirit of the present invention. Further, in an exemplary embodiment, the cutting member 156 and cutting implement 158 utilized for separation of the hide 124 (FIGS. 5A through 5E) may be combined with the marking member 204 and marking implement 206 for marking of the hide. Alternately, the hide may be marked externally in accordance with known methods and cutting apparatus.

Figure 8:
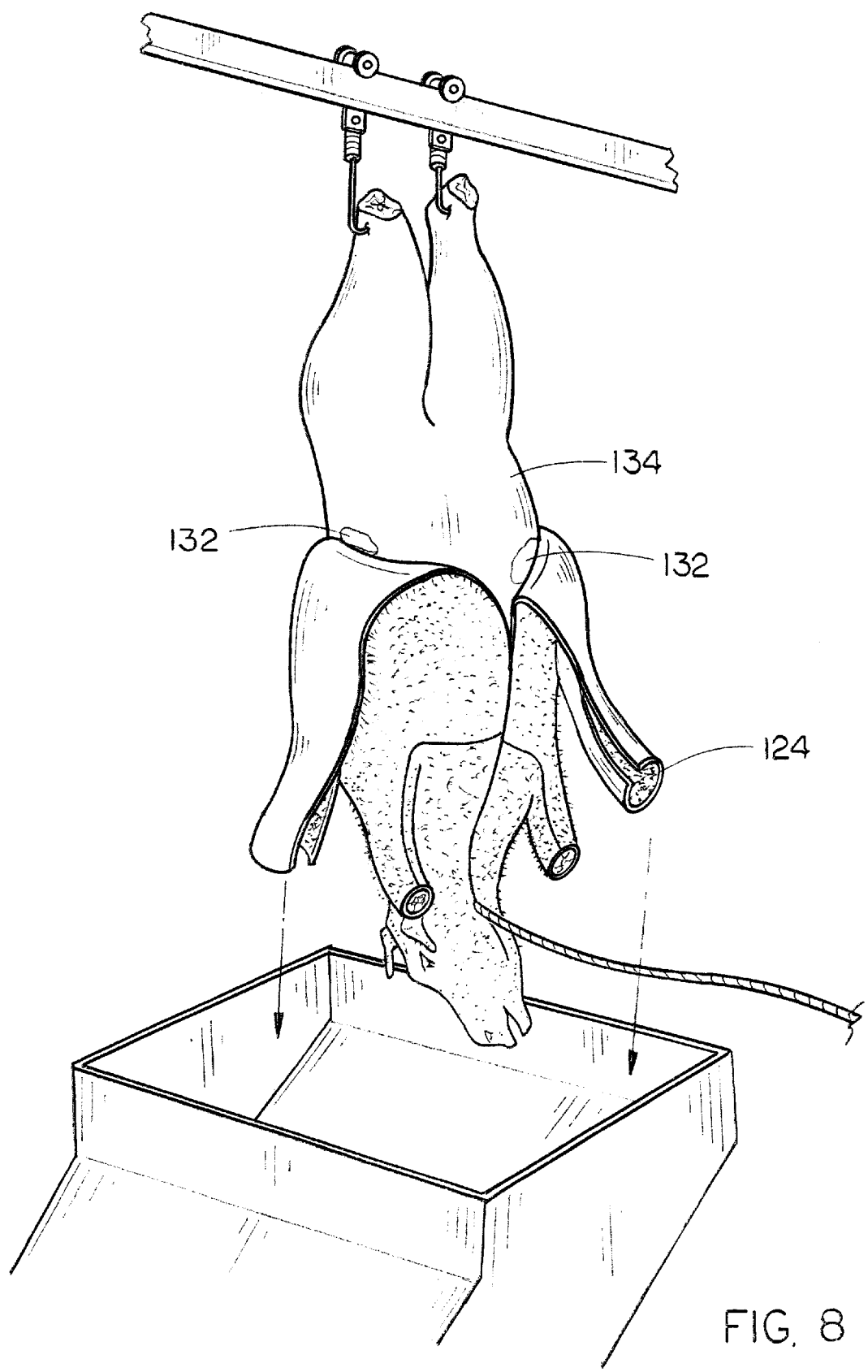
FIG. 8 is a side elevational view illustrating removal of the hide in accordance with an exemplary embodiment of the present invention.

Referring now to FIG. 8, removal of the hide after separation and marking in accordance with the present invention is shown. Preferably, removal of the hide 124, now at least substantially separated from the carcass 134, may be accomplished with a minimum of stress on either the hide 124 and the carcass 134. Thus, damage to the hide 124 such as stretching or tearing, common in downpulling processes, is reduced or eliminated.

As shown in FIG. 8, after separation, the hide 124 is almost completely detached from the carcass 134 (i.e., substantially all connecting tissue 132 is cut). Thus, as it is marked, the hide 124 may essentially fall away from the carcass 134 without further cutting or trimming. Alternately, it is anticipated that at times the hide 124 may not be completely detached by the separating process. Thus, small areas of connecting tissue 132 attaching portions of the hide 124 to the carcass 134 may remain. It may therefore be necessary to manually cut these areas as the hide 134 is removed. However, the amount of connective tissue 132 that must be manually cut or trimmed to remove the hide 124 will be greatly reduced as compared to conventional downpulling processes. Thus, the possibility that an operator may inadvertently cut the hide 124 will also be reduced.

To further prevent contaminants from being transferred to the carcass 134 from the hide 124, the hide 124 may be grasped and folded away from the carcass 134 as it is removed. In this manner, inadvertent contact between the exterior of the hide 124 and the exposed carcass 134 during hide removal is prevented.

Although the methods and apparatus of the present invention have been described, in the exemplary embodiments shown in FIGS. 1 through 8, as being employed in a meat processing facility, it should be appreciated that the present invention may alternately be utilized in industries wherein it is desirable to remove the hide or skin of an animal with a minimum of damage. For example, methods and apparatus of the present invention may be useful in the field of taxidermy wherein it is desirable to remove the hide of an animal so the hide may be used in creating a lifelike replica of the animal. Similarly, the present invention may be utilized in the field of furriery wherein it is desirable to remove the hide of an animal with minimal damage to the hide so the hide may be used in the manufacture of garments such as coats, gloves, hats, and the like.

It is believed that the method and apparatus for aseptically removing animal hides of the present invention and many of the attendant advantages thereof will be understood by the foregoing description, and it will be apparent that various changes may be made in the form, construction and arrangement of the components thereof without departing from the scope and spirit of the invention or without sacrificing all of its material advantages. The form herein before described being merely an explanatory embodiment thereof, it is the intention of the following claims to encompass and include such changes.

What is claimed is:

1. A process for removing the hide of an animal from its carcass, comprising the steps of:
   separating the hide from the carcass using at least one endoscopic cutting member inserted through the hide so as to be disposed between the hide and the carcass for cutting the connecting tissue attaching the hide to the carcass;
   marking the hide to be removed from the carcass; and
   removing the hide from the carcass.

2. The process as claimed in claim 1, further comprising the step of prior to separating the hide, injecting a gas between the hide and the carcass to expand the connecting tissue wherein the hide is at least partially pulled away from the carcass.

3. The process as claimed in claim 1, wherein the separating step comprises the steps of:
   inserting the endoscopic cutting implement through the hide so that the cutting implement is disposed between the hide and carcass; and
   moving the endoscopic cutting implement between the hide and carcass thereby cutting the connecting tissue attaching the hide to the carcass so as to separate the hide from the carcass.

4. The process as claimed in claim 3, wherein the inserting step further comprises sterilizing the hide at each point where the endoscopic cutting implement is inserted.

5. The process as claimed in claim 4, wherein the sterilizing step comprises spraying a sterilizing agent on the hide at the point where the endoscopic cutting implement is inserted.

6. The process as claimed in claim 1, wherein the marking step comprises cutting the hide using the endoscopic cutting implement.

7. The process as claimed in claim 6, wherein the marking step further comprises sterilizing the hide along the area to be cut by the endoscopic cutting implement.

8. The process as claimed in claim 7, wherein the sterilizing step comprises spraying a sterilizing agent on the hide.

9. The process as claimed in claim 1, wherein the marking step comprises inserting a second cutting implement between the hide and carcass and cutting the hide.

10. The process as claimed in claim 9, wherein the marking step further comprises sterilizing the hide along the area to be cut by the second cutting implement.

11. The process as claimed in claim 10, wherein the sterilizing step comprises spraying a sterilizing agent on the hide.

12. A process for separating and removing the hide from a carcass of an animal, comprising the steps of:
    inserting at least one endoscopic cutting implement through the hide so that the cutting implement is disposed between the hide and carcass, said cutting implement suitable for cutting the connective tissue attaching the hide and carcass;
    moving the cutting implement between the hide and carcass thereby cutting the connective tissue so as to separate the hide from the carcass;
    thereafter marking the hide to be removed from the carcass; and
    removing the hide from the carcass.

13. The process as claimed in claim 12, further comprising the step of prior to inserting the endoscopic cutting implement, injecting a gas between the hide and the carcass to expand the connecting tissue wherein the hide is at least partially pulled away from the carcass.

14. The process as claimed in claim 12, wherein the inserting step further comprises sterilizing the hide at each point where the endoscopic cutting implement is inserted.

15. The process as claimed in claim 14, wherein the sterilizing step comprises spraying a sterilizing agent on the hide at the point where the cutting implement is inserted.

16. The process as claimed in claim 12, wherein the marking step comprises cutting the hide using the endoscopic cutting implement.

17. The process as claimed in claim 16, wherein the marking step further comprises sterilizing the hide along the area to be cut by the endoscopic cutting implement.

18. The process as claimed in claim 17, wherein the sterilizing step comprises spraying a sterilizing agent on the hide.

19. The process as claimed in claim 12, wherein the marking step comprises inserting a second cutting implement between the hide and carcass and cutting the hide.

20. The process as claimed in claim 19, wherein the marking step further comprises sterilizing the hide along the area to be cut by the second cutting implement.

21. The process as claimed in claim 20, wherein the sterilizing step comprises spraying a sterilizing agent on the hide.

22. An apparatus for separating and removing the hide of an animal from its carcass, comprising:
    at least one endoscopic cutting member suitable for being inserted through the hide so that the cutting implement is disposed between the hide and carcass; and
    a cutting implement disposed on said cutting member, said cutting implement suitable for cutting the connecting tissue without damaging the hide and carcass;
    wherein said member moves said cutting implement through said connecting tissue so said connecting tissue is cut by said cutting implement thereby separating the hide from the carcass, and
    wherein said cutting member includes an end suitable for being articulated so as to at least partially control the direction of movement of said cutting implement.

23. The apparatus as recited in claim 22, wherein said cutting implement emits a stream of matter under pressure sufficient to cut said connecting tissue.

24. The apparatus as recited in claim 23, wherein said matter emitted under pressure is water.

25. The apparatus as recited in claim 22, wherein said cutting implement comprises a laser.

26. The apparatus as recited in claim 22, wherein said cutting implement comprises:
    a blade suitable for cutting said connecting tissue; and
    a shield for shielding the hide and carcass from said blade so said blade is prevented from cutting said hide and said carcass.

27. The apparatus as recited in claim 22, wherein said cutting implement comprises:
    a saw for cutting said connecting tissue; and
    a shield for shielding the hide and carcass from said saw so said saw is prevented from cutting said hide and said carcass.

28. The apparatus as recited in claim 27, wherein said saw comprises a rotary blade.

29. The apparatus as recited in claim 27, wherein said saw comprises a reciprocating blade.

30. An apparatus for separating and removing the hide of an animal from its carcass, comprising:

means for endoscopically cutting connecting tissue attaching the hide and carcass without damaging the hide or carcass; and means for inserting the cutting means through the hide so that the cutting means is disposed between the hide and carcass;

wherein said inserting means moves said cutting means through the connecting tissue so that the connecting tissue is cut by said cutting means thereby separating the hide from the carcass.

31. An apparatus for separating and removing the hide of an animal from its carcass, comprising:

at least one endoscopic cutting member suitable for being inserted between the hide and carcass; and a cutting implement disposed on said cutting member, said cutting implement suitable for cutting the connecting tissue without damaging the hide and carcass;

wherein said member moves said cutting implement through said connecting tissue so said connecting tissue is cut by said cutting implement thereby separating the hide from the carcass.

\* \* \* \* \*

UNITED STATES PATENT AND TRADEMARK OFFICE
CERTIFICATE OF CORRECTION

PATENT NO.    : 6,394,889 B1
DATED         : July 12, 2002
INVENTOR(S)   : O'Neill It is certified that error appears in the above-identified patent and that said Letters Patent is hereby corrected as shown below:

Drawings,
Sheet 3, FIG. 3A, the reference numeral -- 142 -- should be applied to the tapered end piece of the nozzle 138 so as to indicate a lance for piercing the hide.
Sheets 4, 5, 6 and 7, FIGS. 4A, 4B, 4C, and 4D, the reference numeral -- 128 -- should be applied to the pattern emitting from each corresponding spray nozzle 194 so as to indicate a sterilizing or disinfecting agent.
Sheet 8, FIG. 5A, the reference numeral -- 160 -- should be applied to the cutting member 156 so as to indicate a flexible appendage having one or more segments; the reference numeral -- 128 -- should be applied to the vessel 178 so as to indicate a suitable cleaning and sterilizing agent.
Sheet 10, FIG. 5E, the reference numeral "172" should read -- 171 --; the reference numeral -- 172 -- should then be applied to the posterior region of the nozzle assembly.
Sheet 11, FIG. 6, the reference numeral "120" should read -- 112 --.
Sheet 12, FIG. 7A, the reference numeral "208" indicating one or more segments of the flexible appendage comprising marking member "204" should read -- 215 --.

Column 4,
Lines 16 and 20, the word "is", each occurrence, should read -- are --;
Line 57, the word "role" should read -- roll --.

Column 5,
Line 9, the word "bide" should read -- hide --;
Line 53, the word -- to -- should be inserted after the reference numeral "124";
Line 60, the reference numeral "136" should read -- 138 --;
Line 61, the reference numeral "138" should read -- 136 --.

Column 6,
Lines 3 and 6, the reference numeral "136", each occurrence, should read -- 138 --;
Line 49, the ")" immediately following 4D should be deleted;
Line 59, the word "laparoscopeic" should read -- laparoscopic --.

UNITED STATES PATENT AND TRADEMARK OFFICE
CERTIFICATE OF CORRECTION

PATENT NO. : 6,394,889 B1
DATED : July 12, 2002
INVENTOR(S) : O'Neill

It is certified that error appears in the above-identified patent and that said Letters Patent is hereby corrected as shown below:

Column 7,
Line 9, "5C" should read -- 5D --;
Line 14, the reference numeral "166" should read -- 168 --;
Lines 22, 25 and 32, the reference numeral "170", each occurrence, should read -- 172 --;
Line 22, the reference numeral "172" should read -- 170 --;
Line 24, the reference numeral "132" should read -- 134 --;
Line 26, the reference numeral "172" should read -- 171 --;
Line 32, "5D" should read -- 5E --;
Line 33, the reference numeral "172" should be deleted;
Line 62, the reference numeral "182" should read -- 184 --.

Column 8,
Line 46, the reference numeral "111" should be deleted.

Column 9,
Line 37, the word "laparoscopeic" should read -- laparoscopic -- and the word "is" should be deleted;
Line 41, the reference numeral "210" should read -- 212 --;
Lines 49 and 52, each occurrence, the reference numeral "212" should read -- 210 --.

Signed and Sealed this

Eighteenth Day of March, 2003

JAMES E. ROGAN
*Director of the United States Patent and Trademark Office*